United States Patent Office 3,459,097
Patented Aug. 5, 1969

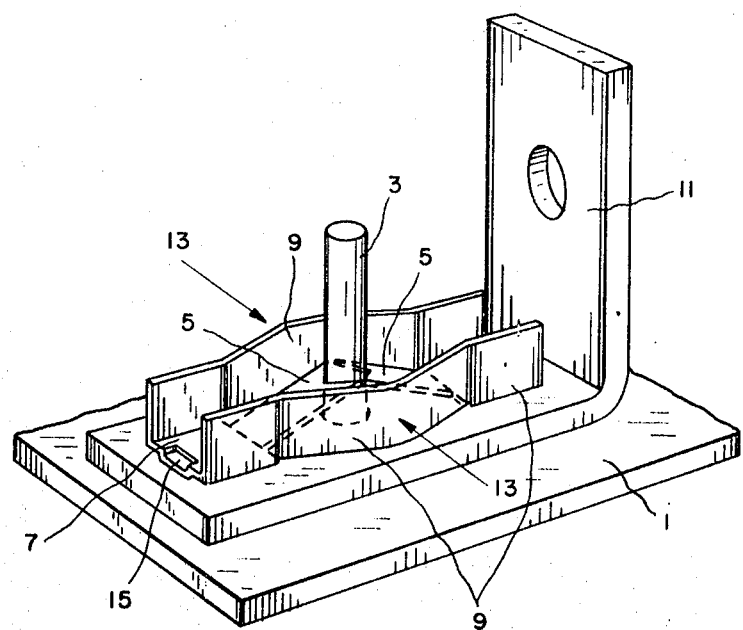

3,459,097
**FASTENER HAVING RESILIENT
RELEASE MEANS**
Henricus Cornelis Adrianus van der Put, and Johannes
Petrus Sinjou, Emmasingel, Eindhoven, Netherlands,
assignors, by mesne assignments, to U.S. Philips Corporation, New York, N.Y., a corporation of Delaware
Filed Mar. 27, 1967, Ser. No. 626,046
Claims priority, application Netherlands, Mar. 25, 1966,
6603919
Int. Cl. F16b 17/00
U.S. Cl. 85—36                                     2 Claims

ABSTRACT OF THE DISCLOSURE

This disclosure relates to a fastener having resilient tongue elements which bindingly engage a pin or shaft member. The fastener is adapted to be readily detached from the pin or shaft member by inwardly depressing a pair of resilient metal strips which cause the tongue elements to separate and thereby release the member. The fastener can then be removed by withdrawal from the pin or shaft member.

---

This invention relates to readily detachable fasteners, fabricated from sheet metal which have opposed tongue elements thereon for gripping a pin or shaft member inserted between the tongue elements.

A known fastener of this type includes a cylindrical sheet metal tube having a pair of tongue elements attached to the circumferential edge of the tube which extend radially inwardly. This fastener is fabricated by deep drawing a metal blank into a cup-shaped form and then accurately punching out a portion of the base of the drawing thereby providing the tongue elements. This fabricating procedure inherently produces a relatively expensive fastener.

An object of this invention is to provide a rapidly releasable fastener which also has a positive gripping action when engaging a pin member.

Another object of the invention is to provide a fastener which is simple and relatively inexpensive to manufacture.

In accordance with the invention a resilient nut-like fastener is provided for gripping a pin or shaft member which includes an integral sheet metal structure having a pair of planar sheet portions, each of said portions having a resilient tongue element extending therefrom. The tongue elements have gripping edges in confronting relation which engage a pin or shaft when the fastener is applied thereto. A pair of curved resilient strips integral with the edges of the sheet portions and positioned normal to the sheet portions provide the means for releasing the fastener from the pin. Applying a force in a direction normal to the strip surface causes the strips to assume a substantially parallel relation which in turn causes a separating movement of the tongue elements gripping the pin thereby effecting a release of the fastener from the pin.

The invention will now be described in greater detail with reference to a preferred embodiment thereof, illustrated in the accompanying drawing in which:

FIGURE 1 shows a perspective view of a fastener engaging a pin in accordance with the instant invention.

The device shown comprises a horizontal plate 1 of insulating molded material which carries a substantially cylindrical pin 3. The pin can include a slight taper in order to facilitate release from the mold. The plate 1 may be, for example, the lower wall of the cabinet of a radio-receiver manufactured by general molding procedures or more particularly by injection molding. The pin 3 is surrounded by a nut-like fastener formed of resilient sheet material, for example, sheet steel. The fastener comprises an integral ring structure having two tongues 5 projecting inwardly in an inclined direction from the plane of the ring; the free opposing ends of the tongues being cut in the form of a V as shown and resiliently clamping the pin 3 which is inserted between the tongues 5. From the figure it may readily be seen that the sloped tongues 5 act as wedging elements which tend to prevent the fastener from being removed from the pin 3 in the upward direction.

The integral structure of the fastener also includes two sheet portions 7 each having one of the tongue elements 5 attached thereto. The sheet portions 7 and the tongue elements 5 are initially located in a plane at right angles to the axis of the ring, said axis being coincident with the axis of the pn 3. Two strip-shaped sheet portions 9 which join the sheet portions 7 together complete the ring structure. The strip portions 9 are positioned normal to the plane of the sheet portions 7. The portion of the strips 9 between the sheet portions 7 is curved outwardly from the tongue elements 5.

In the illustrated example the fastener 5, 7, 9 is used to secure a fastening clasp 11 against the surface of the plate 1. The diameter of the pin 3 is such that the gap between the ends of the resilient tongue elements 5 is insufficient to allow easy passage of the pin 3 which is applied from above. When the fastener is applied to the pin the tongues 5 slightly separate in a resilient manner with the gripping edges sliding along the pin surface. In the illustrated position of the fastening member which is ultimately obtained, the sharp gripping ends of the tongue elements 5 penetrate the pin 3 slightly so that it is impossible without damaging the pin to slide the fastener in the upward direction. In the construction shown it nevertheless remains possible to loosen the fastener by exerting forces as indicated by arrows 13 on the outwardly bent portions of the strips 9. These forces bring about a resilient deformation of the strip portions. From the figure it is seen that the strip portions 9 are at right angles to the sheet portions 7 and also to the arrows 13. With minimal exertion it is possible to push the outwardly-bent portions of the strips 9, located between the sheet portions 7 towards each other which results in the separation of the sheet portions 7, the tongue elements 5 connected thereto thereby permitting the fastener to be easily removed from the pin 3.

Preferably the tongue elements 5 and the strip shaped sheet portions 9 project in the illustrated manner from the plane of the ring on the same side, in this example the upper side. The fastening force derived from the tongue elements 5 is transmitted by the sheet portions 7 to which said tongue elements are connected to the component to be secured, in this example the clasp 11. This connection is further improved by a recessed portion 15 located along the outer edge of each sheet portion 7. Upon applying the fastener, the portion of the ring located between the portions 15 slightly flexes in a resilient manner, resulting in rattle free connection with the component 11.

The above cited embodiment is intended as exemplary only, and while we have described our invention with a specific application and embodiment thereof, other modifications will be apparent to those skilled in the art without departing from the spirit and scope of the invention.

What is claimed is:
1. A resilient fastener comprising a pair of spaced substantially flat coplanar sheet portions having opposed edges, a pair of elongated resilient tongue elements resiliently attached to the opposed edges of said sheet portions and extending transversely from said sheet portions in confronting opposed relationship, said tongue elements each having a notched portion at the confronting end thereof for receiving a pin, a pair of opposed walls extending perpendicularly from the plane of said sheet portions and connecting said pair of sheet portions at mutually corresponding edges, said corresponding edges extending generally perpendicularly to said opposed edges, each of said walls having substantially flat portions abutting said sheet portions and defining therewith a U-shaped channel elongated between said sheet portions and open at both ends, said walls having curved portions arching outward away from said tongue elements, whereby inward pressure on said curved portions of said walls will increase the length of said channel and release said tongue elements from said pin.

2. A fastener as claimed in claim 1 wherein a part of each said sheet portion projects outward away from the tongue members.

References Cited
UNITED STATES PATENTS

| | | | |
|---|---|---|---|
| 2,382,521 | 8/1945 | Tinnerman | 85—36 |
| 2,798,405 | 7/1957 | Steck | 85—36 |
| 2,847,745 | 8/1958 | Becker | 85—36 |

EDWARD C. ALLEN, Primary Examiner